March 7, 1950 R. W. BENFER 2,499,941
AUTOMATIC PLOTTER
Filed March 30, 1945 2 Sheets-Sheet 1
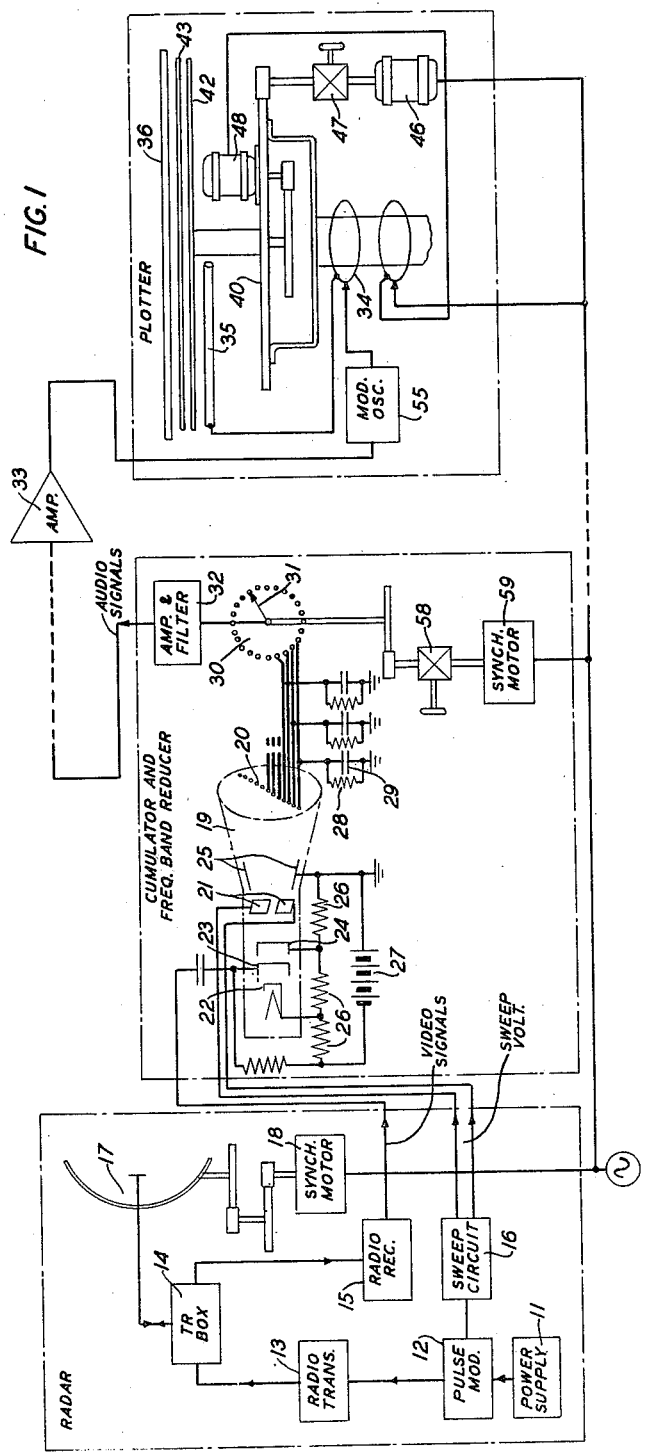
INVENTOR
R. W. BENFER
BY
E. V. Griggs
ATTORNEY March 7, 1950     R. W. BENFER     2,499,941
AUTOMATIC PLOTTER Filed March 30, 1945     2 Sheets-Sheet 2

INVENTOR
R. W. BENFER
BY
E. V. Griggs
ATTORNEY

Patented Mar. 7, 1950

2,499,941

UNITED STATES PATENT OFFICE 2,499,941

AUTOMATIC PLOTTER

Richard W. Benfer, Morristown, N. J., assignor to Bell Telephone Laboratories, Incorporated, New York, N. Y., a corporation of New York Application March 30, 1945, Serial No. 585,697

10 Claims. (Cl. 343—11)

This invention relates to an automatic plotter for translating electrical impulses into signal indications and displaying the same at predetermined circumferential and radial positions on a plotting surface of large diameter; and more particularly to an automatic plotter employed as an extended scale plan position indicator in an object location system.

It has heretofore been customary in connection with object location systems to provide at an information center a plotting board carrying a grid map of a large exploratory area that is being scanned and to transmit telephonically by spoken word to the operators stationed at the plotting board, to be manually marked on the board, target signals which appear upon a small oscilloscopic plan position indicator, or upon a plurality of oscilloscopes each one of which is receiving pulse-echo signals from a portion of the whole exploratory area. Such an arrangement is satisfactory if the targets simultaneously under observation are relatively few. But where there are many targets simultaneously under observation in the exploratory area, the spoken telephonic transmission of essential data to the operators at the information center gives rise to confusion, inaccuracy and delay.

It is the particular object of this invention to provide an extended scale plotting device at the information center for automatically translating into visual indications on or with reference to the grid map of the area under observation a periodically repeated sequence of electrical impulses the time interval between the impulses of which determines the distribution over the grid map of the plotter of luminous signals each of which corresponds in azimuth and range on the grid map with the location in azimuth and range of the corresponding object in the exploratory area.

In its preferred embodiment the present invention includes a plotting table of a sufficiently large diameter so that it may, if desired, be attended by a number of operators. The plotting table is of transparent material preferably coated on its under-surface with a phosphorescent or photoluminescent material, and carrying a large scale grid map of the exploratory area on its upper surface. The phosphorescence or photoluminescence of the under-surface is preferably excited by ultra-violet light and has such a degree of persistence as may be desired. The admission of the exciting light to the proper point on the photoluminescent coating is controlled by circumferential and radial scanning members which, in the case of a radar or object location system, are in synchronism and phase in their movements with the azimuth and range scanning movements of the antenna and its associated range scanning elements. The scanning members at the plotting table are operatively substantially coextensive with the photoluminescent surface of the plotting table, and are supported in such a way that the operating plane of rotation of their scanning parts lies in close proximity to the plane of the photoluminescent under-surface. Thus, the exciting signal-controlled light is substantially directly applied to the particular point on the surface determined by the relative positions of the scanning elements as they are rotated beneath the table surface.

The automatic plotter of the present invention is capable of use in various environments where it may be desired automatically to translate electrical impulses into visual signals appropriately placed on an extended plotting surface; but as the plotter has been designed and is particularly adapted for use in an object location system of the early-warning radar type, it will be specifically disclosed and its operation described in connection with such a system. A system of the nature of that to be described is disclosed in a copending application of W. C. Tinus, Serial No. 585,668, filed March 30, 1945.

The invention will be more clearly understood by reference to the following detailed description, taken in connection with the accompanying drawings forming a part thereof, in which:

Fig. 1 shows in schematic form an object location system employing the preferred form of plotter of the present invention;

Fig. 2 is a schematic diagram of a circuit which may be used for converting the object location impulses into ultraviolet light at the plotter;

Fig. 5 is a view showing in section a part of the upper portion of the plotting table.

Figure 4:
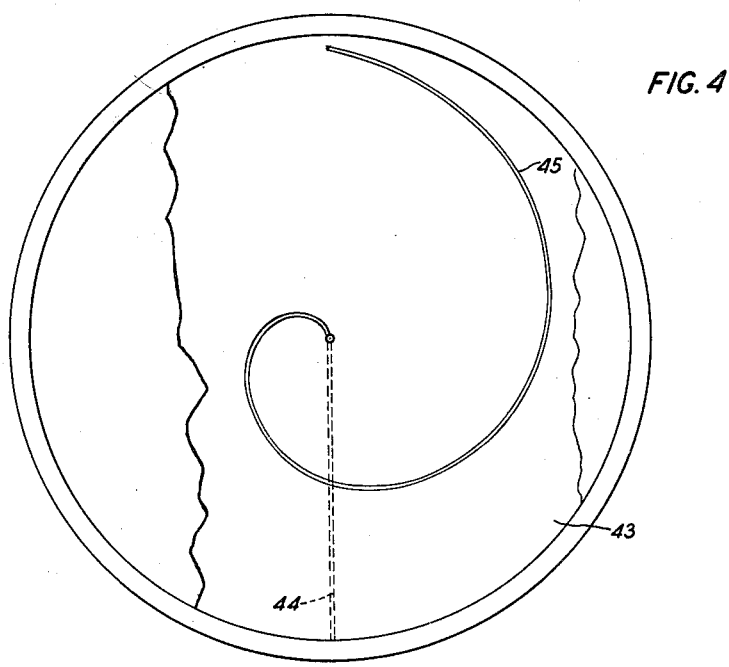
Fig. 4 is a top plan view of the plotting table with parts broken away to show the relation to each other of the slotted scanning elements.

Referring more particularly to the drawings, an object location system including the plotter of the present invention is schematically represented in Fig. 1. Portions of the system which represent elements that are well known and commonly employed in the art are represented in block schematic form. In the arrangement of Fig. 1, power is furnished by the source of power supply 11 to the pulse modulator 12, which is connected by way of the radio transmitter 13 and a TR box 14 to the antenna 17. The pulse modulator 12 produces pulses at any suitable periodicity, such, for example, as 400 per second, each pulse having a length of from one or a fraction to ten microseconds. These pulses are modulated by a suitable ultra-high frequency carrier and are transmitted by way of the radio transmitter 13, TR box 14 and antenna 17. By way of example, the pulse modulator 12 can comprise an oscillator for providing a sine wave having a suitable periodicity. This oscillator energizes a pulse generator of any one of several suitable types well known to the art; for example, that disclosed in United States Patent 2,117,752, issued May 7, 1938, to L. R. Wrathall, which provides an energy pulse at a particular point of each cycle of the input wave supplied to it. The pulses from the pulse generator, modulated by the ultra-high frequency carrier, are applied by way of the TR box 14 to the antenna 17, which serves both as a transmitting antenna and as a receiving antenna to receive waves reflected from one or more objects within the range of the transmitted pulses. The antenna 17 may be of any suitable type, for example, the polystyrene "polyrod" type disclosed in an application of G. E. Mueller, Serial No. 469,284, filed December 17, 1942, now Patent 2,425,336, issued August 12, 1947. The reflected waves picked up by the antenna 17 pass by way of the TR box 14 to the radio receiver 15.

The TR box 14, or transmit-receive box, may be of any desirable type, for example, the type employing a Western Electric Company 709A tube. This tube is essentially a gas discharge protective tube mounted in and forming part of an electrically resonant cavity in electrical communication with the interior of the coaxial transmission line leading to the transmitting and receiving antenna 17. During reception of the low voltages of received energy the gas of the tube is not ionized, the cavity is tuned to electrical resonance with the signal, and the received energy passes through to the radio receiver. During the emission of a pulse from the transmitter the high voltage due to the pulse ionizes the gas in the tube, thus detuning the resonant cavity and preventing any substantial part of the energy of the pulse from reaching the radio receiver.

The reflection or echo waves, after amplification and detection in the radio receiver 15, are applied together with a sweep voltage from the sweep circuit 16 to the cathode-ray or electron beam tube 19. In order that there may be discrimination against random disturbances of relatively large magnitude and in favor of the reflected target signals, the radio receiver 15 preferably includes a clipper or amplitude-limiting device, such as that disclosed in an application of D. Mitchell, Serial No. 464,271, filed November 2, 1942, now Patent 2,395,575, issued February 26, 1946, for limiting the intensity of all voltage variations to that of the maximum signal desired. By way of example, the clipper will remove all voltage variations of greater magnitude than that of the strongest echo.

The sweep voltage is a sweep wave of sawtooth form produced, for example, by a sweep circuit such as disclosed in Patent 2,178,464, issued October 31, 1939, to M. W. Baldwin, Jr. Pulses from the pulse generator and modulator 12 are communicated to sweep circuit 16 to initiate each of the sweep waves so that the electron beam in the cathode-ray tube 19 starts sweep cycles synchronously with the transmission of pulses. If desired, by the use of well-known variable delay means, the sweep wave can be initiated a predetermined short interval after the transmission of each of the pulses to the antenna 17.

The cathode-ray tube 19 is one of the elements of the cumulator, which together perform the function of receiving, distributing in order and storing the target echoes or received signals at the video frequency rate at which they are received from the scanning antenna, and subsequently reducing them to an audio frequency rate at which they are transmitted by audio frequency circuits to the distant plotting board or table. The cathode-ray or electron beam tube 19 may conveniently be of the general type of the tube 20 disclosed in an application of Gould and Mertz, Serial No. 505,028, filed October 5, 1943. Similarly to the tube 20 of the above-mentioned application, the tube 19 of the present application comprises an evacuated container enclosing an extended series of collecting elements 20, an electron gun for generating, focussing and accelerating a beam of electrons of such velocity as to be capable of building up negative charges on the collecting elements, and a pair of electrostatic deflecting plates 21 for causing the beam of electrons to impinge upon each of the collecting elements 20 in turn. The electron beam generated by the electron gun is modulated by the video target signals or reflected impulses detected and amplified by the radio receiver 15. The electron gun may comprise a cathode 22, a control electrode 23 and accelerating anode members 24 and 25. The control electrode 23 is normally maintained at any suitable negative potential with respect to the potential of the cathode 22 by appropriate connection with the serially arranged resistances 26 connected across the terminals of the direct current power supply 27. The electron accelerating elements 24 and 25 are so connected with the resistance 26 as to give them appropriate positive potentials with respect to the cathode 22, the cathode being so connected as normally to have a positive potential with respect to the control element 23. The potential applied to the various electrode members and the location and shape of these members are such that the beam of focussed electrons impinges successively upon the elements 20 as it is moved under the influence of the deflection plates of the sweep circuit. These collecting elements 20 may, if desired, be treated with carbon so as to insure that the ratio of primary electrons striking each element to the number of secondary electrons leaving it is less than one.

Each of the elements 20 swept by the beam of electrons is connected through a parallel resistance member 28 and capacitance member 29 to ground and the positive pole of the direct current power supply 27. The resistance 28 allows the charge imparted by the electron beam gradually to leak off, but the time constant of each circuit is longer than the time between successive pulses projected by the antenna 17. The charge accumulated at each of the elements 20 therefore is gradually built up by the series of received impulses from each target at the repetition rate of the transmitted pulses. Each of the collecting elements 20 of the cathode-ray tube with its storing capacitance 29 and shunted resistance 28 is connected with a corresponding contact member on a commutator switch 30. These contact members are adapted to be successively engaged by a rotating switch arm 31. As each is passed over, the charge accumulated in the associated condenser is transmitted to the assemblage of elements designated as the plotter by way of a circuit that is schematically represented as passing through an amplifier and filter 32 and then through another amplifier 33.

At the plotting center where the information represented by the stored target signals is to be used, the signals are amplified by the amplifier 33, modulated in modulating oscillator 55, and delivered through slip ring and associated brush connections 34 to an ultra-violet lamp 35. The ultra-violet lamp 35 may conveniently be what is known as a "germicidal" lamp, a lamp which is generally like the commercial fluorescent lamps except that the tubular shell is made of a type of glass relatively transparent to ultra-violet light and does not have an interior fluorescent coating.

A suitable circuit for connecting the ultra-violet lamp 35 with the incoming circuit is schematically shown in Fig. 2. The transmission of the signal impulses through the lamp 35 is between the two filament electrodes 49 and 50 which are normally maintained heated to facilitate the discharge through the tube in response to the incoming signals. Preferably the tube electrodes would be of the equipotential heater type. The heating current is supplied by a source of current which is applied by way of brushes in engagement with slip rings 51 and 52 on the shaft carrying the rotating platform 40 of the plotter. The heating filaments 49 and 50 may be serially included in this circuit, as in the case of commercial fluorescent lamps.

The signal impulse is applied through the brush and slip ring 53 to the electrode 50 corresponding to the slip ring and associated brush connections 34 of the more schematic showing in Fig. 1, the energy of the impulse being prevented from being dissipated in the filament heating circuit by the interposition of high frequency choke coils 54 in the conductive paths extending from filament 50. The signal is preferably applied through the medium of a modulating oscillator 55, which may be part of the unit designated as 33 in Fig. 1, or may be in addition thereto. The unit 55 preferably generates a high frequency wave, say, one megacycle, which is modulated by the signals. The arrangement is preferably such that normally there is very little if any flow of oscillatory high frequency current through the lamp 35. Each incoming signal in effect triggers off the modulator oscillator to transmit a relatively large flow of high frequency current through the ultra-violet lamp circuit and cause corresponding ultra-violet radiation. To stabilize its operation and increase its efficiency the lamp 35 is preferably enclosed in a heat-insulating jacket provided with a slot to permit the passage of ultra-violet light through registering slots in the associated scanning elements.

Figure 3:
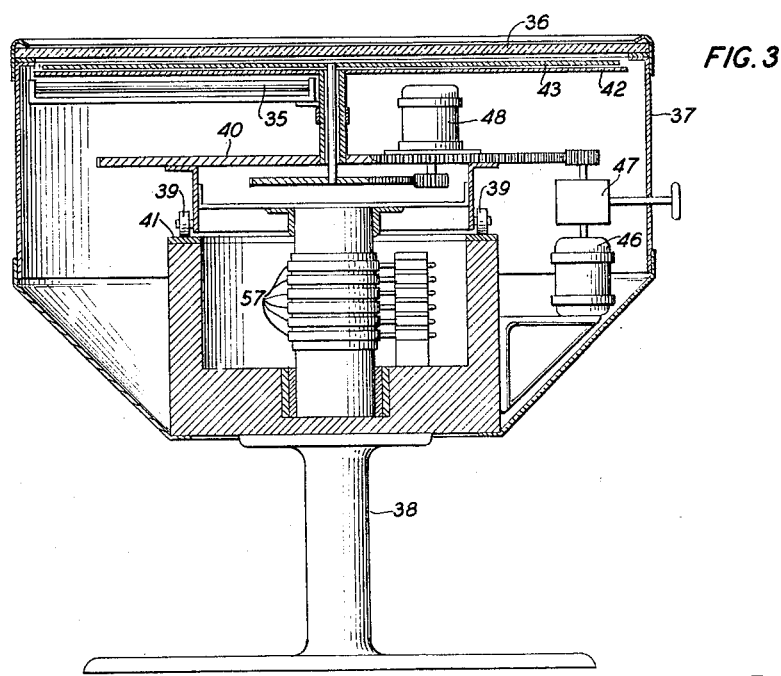
Fig. 3 shows the plotting table in sectional elevation.

The plotting table is shown schematically in Fig. 1, and in detail in Figs. 3, 4 and 5. The top of the plotting table may consist of a large diameter circular plate of glass or similar translucent material 36, and may be large enough to be worked on simultaneously by several operators. As shown in Fig. 3, the top 36 is supported by cylindrical housing 37 carried on a pedestal 38. Within the housing is a rotatable platform 40 supported by a plurality of wheels 39 running on a circular track 41. The platform 40 carries two scanning members 42 and 43, which in the form of the invention illustrated are two coaxial slotted discs. The disc 42 is provided with a radial slot 44, and the disc 43 is provided with a spiral slot 45. The spiral slot 45 consists of a single spiral extending from approximately the center to approximately the periphery of the disc 43, and is so shaped that its radius at all points is proportional to its angle of rotation.

Both coaxial slotted discs 42 and 43 are carried by the rotatable platform 40, and both therefore rotate with the platform. The platform is driven by the motor 46 through a mechanical differential 47 by the engagement of a pinion with the gear teeth with which the periphery of the platform 40 is provided. Supplemental driving means is provided for the spirally slotted disc 43 in the form of a motor 48 carried on the platform 40 and gears connecting motor 48 with the coaxial central shaft of the disc 43. The gear ratios are such that the angular rate of rotation of spirally slotted disc 43 is high as compared with that of radially slotted disc 42. The ultra-violet lamp 35 is carried on a bracket attached to the tubular coaxial shaft that connects the radially slotted scanning disc 42 with the rotatable platform 40. The lamp 35 therefore rotates with the disc 42, and is so positioned that it lies directly beneath the radially extending slot 44 in scanning disc 42. Therefore ultra-violet light from the lamp 35 is in position to pass through any portion of the length of the radial slot 44 which is not obstructed by the superposed coaxial scanning disc 43.

The spirally slotted disc 43 has a rate of rotation such that the spiral slot 45 scans the radial slot 44 from end to end in an interval of time very short relative to the interval required for the radially slotted disc 42 to make one complete revolution. Where the two slots intersect, such ultra-violet light as is produced in the lamp 35 is permitted to pass, as shown in Fig. 5, to the lower surface of the translucent top 36 of the plotting table.

The under-surface of the translucent or transparent top 36 is provided with a phosphorescent coating 56, as shown particularly in Fig. 5. The phosphorescent coating 56 is preferably of a material chosen to have a sufficiently long luminous persistence to permit the operator or operators attending the plotting table to mark each significant target indication as it appears. In accordance with the usual practice, the top 36 of the plotting table may carry a grid map of the area being scanned by the antenna, and the target signals of interest may be marked by the operators on this map directly above the corresponding luminous points produced on the phosphorescent surface by the automatic plotting elements. The electrical connections with the various elements carried by the rotatable platform 40 are made through the medium of the slip rings 57 and their associated brushes.

Various expedients known in the art but not illustrated herein may be employed for limiting the effective spread of the light field of the ultra-violet radiation from the lamp 35, and for focussing the radiation to as great an extent as possible upon a small area of the phosphorescent coating 56 immediately above the aperture formed by the intersection of the two scanning slots. One such expedient is the use of a long cylindrical lens such as a quartz rod, which may be carried in or in close association with the radial slot 44 in the scanning member 42.

The rotating platform 40 and the associated radially slotted scanning member 42 are arranged to be driven in synchronism with the azimuth sweep of the radar antenna 17, and the spirally slotted scanning member 43 is arranged to be driven in synchronism with the range scanning rotation of the brush 31 of the cumulator commutator. The antenna 17 is rotated through speed reduction gearing by the synchronous motor 18, and the brush 31 of the cumulator commutator is rotated through speed reduction gearing and mechanical differential gearing 58 by the synchronous motor 59. The motors 46 and 48 associated with the plotter, and respectively driving the rotatable platform 40 and the spirally slotted scanning disc 43, are synchronous motors; and these, as well as the synchronous motor 18 for effecting the range sweep of the antenna and synchronous motor 59 for effecting the range sweep of the cumulator commutator brush 31, derive their alternating current power from the same source of supply and therefore are maintained in operating synchronism with each other. By means of the mechanical differential 47 the azimuth phase relation of the radially slotted scanning disc 42 with the map of the exploratory area on the plotting table 36 may be manually adjusted to correspond with the azimuth phase relation of the antenna 17 with the exploratory area; and by means of the mechanical differential 58 the range scanning sweep of the cumulator commutator brush 31 is manually adjusted to correspondence with the scanning sweep of the spiral slot in scanning member 43 over the radial slot in scanning member 42. Thus adjusted the target indications on the map of the plotting table each appear at the point in azimuth and range on the map that corresponds with the actual location in azimuth and range of the object or target in the exploratory area.

What is claimed is:

1. In an object location system, a scanning antenna system rotating in azimuth, means for projecting from said antenna system a series of energy pulses into sequentially scanned portions of an exploratory area and receiving reflected energy impulses from objects lying in each portion as it is scanned, range scanning means for receiving and distributing the energy of said reflected impulses in accordance with the elapsed time interval between each projected pulse and each of the reflected impulses, a plotting table having a photoluminescent surface, an azimuth scanning member juxtaposed and in close contiguity to said table and having an azimuth slot moving in synchronism and phase with the azimuth rotation of said scanning antenna system, a range scanning member in like association with said table and having a range slot moving in synchronism and phase with the movement of said range scanning means, a source of ultraviolet light, and means controlled by the distributed reflected energy from each of said objects to energize said light source to cause ultraviolet light to pass to said photoluminescent surface at a corresponding point of intersection of said azimuth scanning slot and said range scanning slot, whereby a luminous signal is produced on the photoluminescent surface at a point corresponding in azimuth and range with the location of the object from which the distributed reflected energy is received.

2. In an object location system, a scanning antenna system rotating in azimuth, means for projecting from said antenna system a series of energy pulses into sequentially scanned portions of an exploratory area and receiving reflected energy impulses from objects lying in each portion as it is scanned, range scanning means for receiving and distributing the energy of said reflected impulses in accordance with the elapsed time interval between each projected pulse and each of the reflected impulses, a plotting table, two scanning members, juxtaposed to said table and in close contiguity thereto, rotating in synchronism and phase, respectively, with the azimuth rotation of the scanning antenna and the range movement of the range scanning means, a source of light also juxtaposed to said table and scanning members, and means controlled by the distributed reflected energy from each of said objects to energize said light source to cause light to pass to the surface of said plotting table under the control of said plotting table scanning members, whereby a luminous signal is produced on the surface of the plotting table at a point corresponding in azimuth and range with the location of the object from which the distributed reflected energy is received.

3. In an object location system, a scanning antenna system rotating in azimuth, means for projecting a series of energy pulses into sequentially scanned portions of an exploratory area and receiving reflected energy impulses from objects lying in each portion as it is scanned, range scanning means for receiving and distributing the energy of said reflected impulses in accordance with the elapsed time interval between each projected pulse and each of the reflected impulses, a plotting table having a photoluminescent surface, scanning members, juxtaposed and in close contiguity to said table and comprising coaxial discs substantially coextensive with said surface, one of said discs having a radial slot and the other a spiral slot centering on the common axis, means for driving said discs in synchronism and phase with said scanning antenna and said range scanning means respectively, a source of light, and means controlled by the distributed reflected energy from each of said objects to energize said light source to cause light to pass to the surface of said plotting table at a corresponding point of intersection of the radial and spiral slots of said scanning members, whereby a luminous signal is produced on the surface of said plotting table at a point corresponding in azimuth and range with the location of the object from which the distributed reflected energy is received.

4. A large scale automatic plotter, comprising a plotting table, a source of light, modulating means therefor responsive to energy impulses to be plotted, means for directing the modulated light to different circumferential and radial portions of said plotting table to produce luminous indications thereon, said means comprising coaxial slotted discs interposed in the path of light to said table from said source, one of said discs containing a radial slot and the other a spiral slot centering on the common axis, and means for differentially driving said discs, whereby said spiral slot scans the parts of the surface of said table sequentially exposed to the light through said radial slot, the distribution of the luminous indications over the surface of the table being determined by the time distribution of the light modulating impulses.

5. A large scale automatic plotter, comprising a plotting table, a source of light, modulating means therefor responsive to energy impulses to be plotted, means for directing the modulated light to different circumferential and radial portions of said plotting table to produce luminous indications thereon, said means comprising rotatable members interposed in the path of light to said table from said source, one of said members containing a radial slot and the other intersecting slot arranged to be advanced from one end to the other of said radial slot in each complete revolution of the corresponding member, and means for differentially rotating said members, whereby said intersecting slot admits modulated light from said source to the parts of the surface of said table sequentially exposed through said radial slot, the distribution of the luminous indications over the surface of the table being determined by the time distribution of the light modulating impulses.

6. A large scale automatic plotter, comprising a plotting table having a photoluminescent surface, a source of ultra-violet light, modulating means therefor responsive to energy impulses to be plotted, means for directing the modulated ultra-violet light to different circumferential and radial portions of said surface to produce luminous indications thereon, said means comprising rotatable members interposed in the path of light to said table from said source, one of said members containing a radial slot having a length substantially that of the radius of said photoluminescent surface and the other an intersecting slot arranged to be advanced from one end to the other of said radial slot in each revolution of the intersecting slot member, and means for rotating said members at different speeds such that the intersecting slot admits ultra-violet light from said source sequentially to the photoluminescent surfaces of the table from one end to the other of said radial slot for each small angular advance of said radial slot member, the radial and circumferential distribution of said luminous indications over the surface of the table being determined by the time distribution of said energy impulses.

7. A large scale automatic plotter, comprising a plotting table, a source of light, modulating means therefor responsive to energy impulses to be plotted, means for directing the modulated light to different circumferential and radial portions of said table to produce luminous indications thereon, said means comprising rotatable members interposed in the path of light to said table from said source, one of said members having a radial slot and the other an intersecting slot arranged to be advanced from one end to the other of said radial slot in each complete revolution of the intersecting slot member to admit light to the corresponding sector of said plotting table, a common rotatable support carrying both said members, driving means for causing the rotation of said support, and supplemental driving means associated with said support and operating to drive said intersecting slot member at a higher angular rate of rotation than said radial slot member.

8. A large scale automatic plotter, comprising a plotting table, a member adapted to scan said table circumferentially and a member adapted to scan said table radially, a support carrying both said scanning members and adapted to impart to them a movement of rotation with respect to said table on an axis coinciding with the center of the table, a source of light, means for modulating the same in accordance with the signals to be plotted, and means controlled by the positions of said scanning members with respect to each other and the table to distribute light from said source to different circumferential and radial points on said table in accordance with the time distribution of the signal modulations.

9. A large scale automatic plotter, comprising a plotting table having a photoluminescent surface, a support rotatable with respect to said table on an axis coinciding with the center of the table, said support carrying a member having a radial slot adapted in the rotation of said support to scan said table circumferentially, a member having a spiral slot also carried by said support adapted to scan radially the portion of said table that is being scanned circumferentially by said radially slotted member, a source of light, means for modulating the same in accordance with signals to be plotted, and means controlled by the positions of said scanning members with respect to each other and the table to distribute light from said source to different circumferential and radial points on the photoluminescent surface of said table in accordance with the time distribution of the signal modulations.

10. A large scale automatic plotter, comprising a plotting table having a photoluminescent surface, two scanning elements rotatable in a plane in close proximity to and substantially coextensive with the plane of said photoluminescent surface, one of said elements having a radially extending slot and the other an intersecting slot arranged to be advanced from one end to the other of said radial slot in each revolution of the intersecting slot member, a source of signal-modulated light, and means for rotating both said members with respect to the table and at different rates with respect to each other such that said intersecting slot admits signal-modulated light from said source sequentially to the photoluminescent surface of the table from one end to the other of said radial slot for each small angular advance of said radial slot member and in accordance with the time distribution of the signal modulations.

RICHARD W. BENFER.

REFERENCES CITED

The following references are of record in the file of this patent:

UNITED STATES PATENTS

| Number | Name | Date |
| --- | --- | --- |
| 1,418,240 | Curie | May 30, 1922 |
| 1,810,610 | Jones, Jr. | June 16, 1931 |
| 1,924,174 | Wolf | Aug. 29, 1933 |
| 2,063,906 | Boch | Dec. 15, 1936 |
| 2,363,600 | Lawlor | Nov. 28, 1944 |
| 2,426,245 | Skellett | Aug. 26, 1947 |

FOREIGN PATENTS

| Number | Country | Date |
| --- | --- | --- |
| 520,778 | Great Britain | May 3, 1940 |
| 542,634 | Great Britain | Jan. 21, 1942 |